(12) United States Patent
Eidenbenz

(10) Patent No.: US 10,888,403 B2
(45) Date of Patent: Jan. 12, 2021

(54) INTERDENTAL BRUSH AND CLEANING DEVICE FOR THE SAME

(71) Applicant: Stefan Eidenbenz, Zumikon (CH)

(72) Inventor: Stefan Eidenbenz, Zumikon (CH)

( * ) Notice: Subject to any disclaimer, the term of this patent is extended or adjusted under 35 U.S.C. 154(b) by 584 days.

(21) Appl. No.: 15/524,909

(22) PCT Filed: Nov. 6, 2015

(86) PCT No.: PCT/CH2015/000164
§ 371 (c)(1),
(2) Date: May 5, 2017

(87) PCT Pub. No.: WO2016/070294
PCT Pub. Date: May 12, 2016

(65) Prior Publication Data
US 2017/0340421 A1 Nov. 30, 2017

(30) Foreign Application Priority Data
Nov. 7, 2014 (CH) ..................... 1731/14

(51) Int. Cl.
*A61C 15/00* (2006.01)
*A46B 7/02* (2006.01)
*A46B 13/02* (2006.01)

(52) U.S. Cl.
CPC .............. *A61C 15/00* (2013.01); *A46B 7/023* (2013.01); *A46B 13/02* (2013.01); *A46B 2200/108* (2013.01)

(58) Field of Classification Search
CPC ........ A61C 15/00; A61C 15/048; A61C 15/02
See application file for complete search history.

(56) References Cited

U.S. PATENT DOCUMENTS 4,367,759 A  1/1983 Kline
5,927,300 A * 7/1999 Boland ............... A61C 15/047
                                                    132/322

(Continued)

FOREIGN PATENT DOCUMENTS

DE    198 49 531 A1    5/2000

OTHER PUBLICATIONS

International Search Report and Written Opinion dated Jan. 25, 2016 in PCT/CH2015/000164 with English-language translation (6 pgs.).

*Primary Examiner* — Rachel R Steitz
*Assistant Examiner* — Brianne E Kalach
(74) *Attorney, Agent, or Firm* — Foley & Lardner LLP

(57) ABSTRACT

An interdental brush (1) comprises a body (4) with a handle (5) and a guide channel (7). Also provided is a connecting element (9), which connects a cleaning body (3) to an operating element (6). The connecting element (9) with the cleaning body (3) can be displaced in a reciprocating manner within the guide channel (7), by means of the operating element (6), between a retracted position, in which the cleaning body (3) is arranged within the guide channel (7), and an extended position, in which the cleaning body (3) projects out of the guide channel (7) at a distal end of the guide channel (7), as seen in relation to the handle (5). A flexible positioning element (2) is provided at the distal end of the guide channel (7). The positioning element (2) can be placed in an approximal space between two teeth such that the cleaning body (3), during displacement into the extended position, penetrates into the approximal space. The reciprocating displacement of the cleaning body (3) can be induced by movement of the operating element (6) relative to the positioning element (2) of the interdental brush (1).

17 Claims, 8 Drawing Sheets

(56) References Cited

U.S. PATENT DOCUMENTS

| | | | | |
|---|---|---|---|---|
| 6,102,700 A | * | 8/2000 | Haczek | A61C 15/00 |
| | | | | 433/118 |
| 8,011,057 B2 | * | 9/2011 | Nejat | A46B 5/02 |
| | | | | 15/167.1 |
| 8,474,467 B2 | * | 7/2013 | Coates | A61C 15/00 |
| | | | | 132/322 |
| 9,050,160 B1 | * | 6/2015 | Alali | A61C 15/046 |
| 9,168,115 B2 | * | 10/2015 | Zmiyiwsky | A61C 15/046 |
| 2004/0197735 A1 | * | 10/2004 | Lesage | A61C 15/00 |
| | | | | 433/141 |
| 2008/0254408 A1 | | 10/2008 | Coates | |
| 2009/0029323 A1 | | 1/2009 | Nejat | |

\* cited by examiner

INTERDENTAL BRUSH AND CLEANING DEVICE FOR THE SAME

CROSS REFERENCE TO RELATED APPLICATIONS

This application is a National Phase Entry of PCT/CH2015/000164, filed Nov. 6, 2015; which claims the priority of Swiss Patent Application No. 1731/14, filed on Nov. 7, 2014, the entire contents of both of which are incorporated herein by reference.

BACKGROUND OF THE INVENTION

The invention relates to an interdental brush and to a cleaning device for the same, according to the independent claims.

In the dental hygiene sector there is a very wide selection of solutions for cleaning teeth. Standard toothbrushes for cleaning the tooth faces are available in many variations. Electrically operated toothbrushes which are capable of generating movements of the brush head at high frequencies have also been developed. Therewith, teeth can be cleaned in the most efficient manner in the accessible locations. However, all conventional toothbrushes as well as the electrically operated toothbrushes have the disadvantage that they cannot remove the biofilm between the teeth. Various methods for cleaning this approximal space have been developed.

Dental Floss:

In the prophylaxis of tooth decay, dental floss has the maximum effect on the contact points of the teeth. Said dental floss is introduced as a thin thread via the contact point into the interdental space. Plaque is hereby stripped away. Dental floss above all serves for preventing tooth decay because it can greatly reduce the plaque-related decalcification of the dental enamel in the region of mutually contacting teeth. The complex handling and the risk of injuries to the gums in the case of an incorrect application are disadvantageous herein. The application is very difficult or completely precluded in certain cases (tight spacing), for example when neighboring teeth have been blocked (bridges, orthodontist apparatuses, retainers).

Interdental Brushes:

Interdental brushes are used above all in the intermediate space between teeth that has been opened up by bone atrophy. Interdental brushes are the main pillar for daily application in the modern prophylaxis of periodontal pathology. The care of the approximal space by way of interdental brushes has also achieved high priority in the prevention of root decay. This is a modern phenomenon as a result of a reduced saliva flow rate. Anomalies in the saliva flow arise very often in geriatric medicine and as side effects of many medicaments. The interdental brush is indispensable in stationary reconstruction by way of implants. Since neighboring implants are typically mutually blocked, there are no alternatives to the brushes for cleaning between the implants. The interdental brush can be introduced into the intermediate space between the teeth directly by the finger or using a handle to which the brush is connected via a stem. The cleaning effect is achieved by simply bracing an adequate small brush in the trigone that is delimited by the tooth, the neighboring tooth, and the gingiva. Smallest niches or locations which for root-related causes have double concavities can be relieved of the biofilm in a proven and thorough manner. As opposed to tooth picks, interdental wooden picks, or felt-coated sticks, the interdental brush by erecting the bristles is capable of developing a cleaning effect even after having passed an isthmus. The handling in relation to the introduction, the buckling of the thin small brushes, and the risk of injury are disadvantageous in the application of interdental brushes. While the introduction of small interdental brushes in the visible region of the intermediate spaces between the teeth can easily be practiced in front of a mirror, issues arise beyond the second premolar and certainly at the latest between the first two molars. First, the mucosal lining of the cheeks bears more tightly on the dentition as additional opening of the mouth occurs. The introduction of a small brush at an angle that is perpendicular to the facial area of the molars is greatly impeded if not precluded. This leads to the user being tempted to close the mouth again during introduction between the back teeth, this leading to the second issue. A visible check relating to the position and direction of the delicate small interdental brush is no longer provided. The introduction into the approximal space then quickly becomes a matter of trial and error unless a finger of the second hand is used for holding down the cheek. The daily use of interdental brushes sets relatively high requirements for the patient. Standing in an uncomfortable position, typically bent forward over the washbasin facing toward the bathroom mirror, the application is seen as a tedious chore. The handling requires attention and certain motoric capabilities which recede when growing older.

SUMMARY OF THE INVENTION

It is an object of the invention to provide an interdental brush which at least minimizes these issues. In particular, the object of the invention lies in enabling a type of cleaning of intermediate spaces between teeth that is ergonomic and as comfortable as possible, wherein simultaneously a high cleaning effect can be achieved and the risk of injury is minimized.

In a first aspect of the invention, this object is achieved by means of an interdental brush comprising a body having a handle and a guide duct. The interdental brush furthermore comprises a connection element that is disposed in the guide duct and connects a cleaning body to an operating element. The connection element with the cleaning body is displaceable in a reciprocating manner by means of the operating element. The displacement takes place between a retracted position in which the cleaning body is disposed within the guide duct, and a deployed position in which the cleaning body at an end of the guide duct that is distal in relation to the handle protrudes from the guide duct. A flexible positioning element is provided at the distal end of the guide duct. The positioning element at an approximal space between two teeth is engageable in such a manner that the cleaning body during the displacement to the deployed position ingresses into the approximal space. The positioning element runs toward the distal end in a substantially funnel-shaped manner. The reciprocating displacement of the cleaning body is capable of being caused by a movement of the operating element relative to the positioning element of the interdental brush.

One advantage of the interdental brush according to the invention lies in that the movement of the cleaning body is performed from outside the mouth, this greatly simplifying the operation of the interdental brush. It is furthermore advantageous that the positioning element is provided, with the aid of which positioning element the cleaning body at the intended position is capable of being guided in an easy and intuitive manner for cleaning the regions in between the teeth.

The funnel-shaped profile of the positioning element toward the distal end is particularly advantageous in order for the respective approximal space between two teeth to be rapidly found and for the interdental brush to be correctly engaged. In other words, the funnel shape has an inherent "auto centering function".

In one preferred embodiment the positioning element is elastically deformable. Said positioning element can be produced from a rubber-type material, for example from rubber or silicone. This is particularly advantageous since the positioning element can adapt to the contour of the approximal space and therefore has a more stable fit. A further advantage lies in that the risk of injury to the gums or a tooth is minimized, since the positioning element is soft. The user, prior to moving the cleaning body from the retracted position, seeks the approximal space and positions the interdental brush at the approximal space. On account of this procedure there is no risk of the user being injured by the pointed cleaning body during the positioning process.

The guide duct in relation to a longitudinal axis of the body of the interdental brush preferably has at least one curvature in such a manner that the free end of the guide duct is not parallel with the longitudinal axis. The operation of the interdental brush is simplified by way of this measure that serves the ergonomics, since the user during teeth cleaning can hold the interdental brush in a natural position of the arm or the hand, respectively.

In one embodiment an opening of the positioning element through which the cleaning body in the deployed position exits toward the outside has a smaller diameter than the cleaning body, this having the advantage that the bristles of the cleaning body during retraction to the retracted position are bent outward on the opening of the positioning element and are cleaned by the friction on the contour of the opening of the positioning means. It is also possible for the cleaning body to be cleaned more thoroughly under running water by carrying reciprocating movements of the operating element in the same manner as during cleaning of the teeth.

In one embodiment the guide duct through the generated surface thereof has an opening, through which opening air can circulate between an interior space of the guide duct and the environment. The at least one opening of the guide duct herein is preferably disposed in a region in which the cleaning body in the retracted position comes to rest. The advantage of such an opening lies in that the interior space of the guide duct can be ventilated such that the cleaning body, which following use can be wet, can rapidly dry and no fungi or bacteria can accumulate in the interior of the guide duct, for example. Furthermore, the interior of the guide duct can more readily be rinsed with water. The opening can furthermore be used as an introduction opening for a medication.

A second aspect of the invention relates to a cleaning device for an interdental brush according to the first aspect of the invention, said cleaning device comprising a cleaning body and a connection element, or consisting of a cleaning body and a connection element. The cleaning body in the axial direction of the connection element is disposed on the distal end of the latter. The connection element is produced from a material that in terms of bending is flexible, and by means of a coupling element of the connection element is fastenable in the guide duct of the interdental brush.

In one preferred embodiment the cleaning body comprises a main body having at least one protrusion. A pointed rod-shaped element of the cleaning body is provided at the free end of the cleaning body, so as to be in the extension of the main body.

The cleaning body is preferably produced in an integral manner from one material, in particular, cast.

One advantage of the cleaning device according to the invention is the potential for interchangeability with another cleaning device, wherein the type of cleaning body that is integrated in the cleaning device is irrelevant. A further advantage lies in that the pointed rod-shaped element represents an additional aid for positioning the cleaning body at the correct locations at the approximal space.

The cleaning device is preferably used for replacing the cleaning body and the connection element of the interdental brush according to the first aspect of the invention. This enables a cost-effective and material-saving solution, since the body of the interdental brush having the guide duct and the positioning element needs to be purchased only once and only the cleaning device needs to be replaced once a cleaning body has worn out.

BRIEF DESCRIPTION OF THE DRAWINGS

Exemplary embodiments of the invention will be explained in more detail hereunder by means of the figures, in which.

DETAILED DESCRIPTION OF THE INVENTION

Elements which are equivalent in structural or functional terms are identified by the same reference sign in the figures that illustrate the various embodiments of the interdental brush according to the invention.

Figure 1:
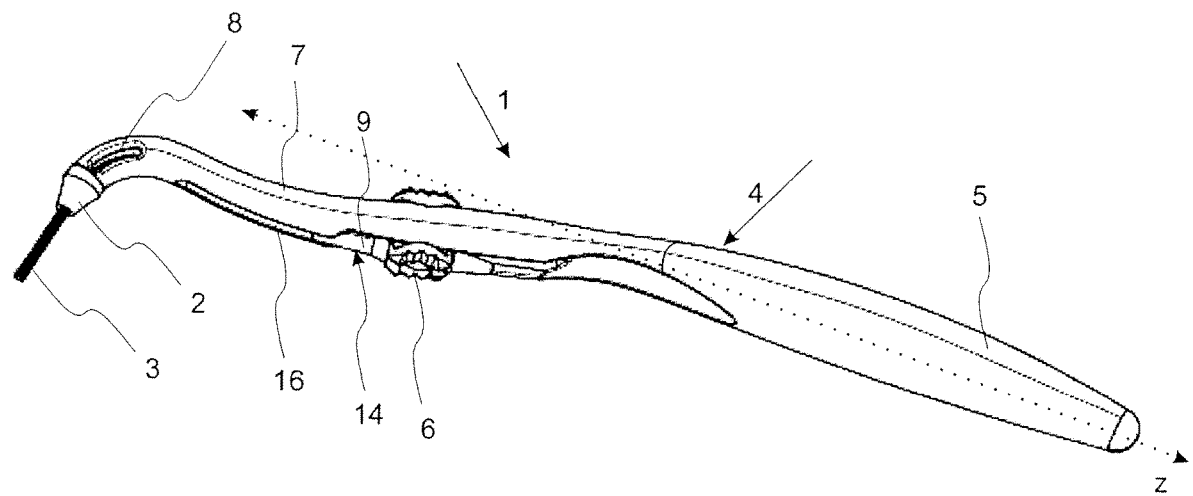
FIG. 1 shows an embodiment of an interdental brush according to the invention.

FIG. 1 shows one embodiment of an interdental brush 1 according to the invention. The interdental brush 1 has a body 4 having a handle 5 and a guide duct 7. The handle 5 and the guide duct 7 in this embodiment are constructed so as to be integral, this being advantageously cheaper in production. In another embodiment the guide duct 7 can be removable from the handle 5. The connection between the handle 5 and the guide duct 7 herein can be a screw connection. This embodiment has the advantage that the guide duct 7 can be replaced.

The interdental brush 1 furthermore has an operating element 6 on the body 4. A connection element 9 carrying a cleaning body 3 is disposed in the guide duct 7, wherein the connection element 9 is not visible in this figure (cf. FIGS. 2, 3). The connection element in the embodiments described hereunder is a pin 9. However, connection elements which deviate from the shape of a pin can also be employed. The cleaning body 3 can be a small brush, for example, which has dimensions that are suitable for interdental cleaning. However, a plastic-material carrier having pimples or fibers can also be employed. Further design embodiments of the cleaning body 3 will be described in more detail in conjunction with FIGS. 6-16. The guide duct 7 at the distal end has a flexible positioning element 2. The term "distal" in the present document relates to the handle 5, in other words to that free end of the guide duct 7 that is remote from the handle. The term "flexible" in the present context is to be understood as being "pliable" and/or "elastic". In other words, the positioning element 2 by virtue of the flexibility thereof is capable of nestling to the approximal space between two teeth.

An opening 8 which allows a circulation of air between the interior space of the guide duct 7 and the environment is provided in a generated surface of the guide duct 7. The opening 8 is preferably disposed in a region in which the cleaning body 3 in the retracted position comes to rest. It is also possible for a plurality of openings 8 to be provided; the generated surface of the guide duct 7 can be provided with perforations, for example.

However, the opening 8 can also serve as an introduction opening for a medication. In this case, the interior space of the guide duct 7 assumes the task of a medication reservoir. Depending on the application, the opening 8 in the case of this embodiment can be closable when a comparatively large quantity of the medication is incorporated in the interior space of the guide duct 7. In this case, the cleaning body 3 upon exhaustion of the medication during cleaning can repeatedly be moved to the retracted position in order for new medication to be received. By virtue of the closure of the opening 8, no medication can escape when the interdental brush is being handled. On the other hand, it is also possible for no closure to be provided, in particular when only single-application doses of the medication are incorporated in the interior space. The medication can be toothpaste or other agents which are known to a person skilled in the art.

As can be seen in the drawing, the guide duct is bent in relation to a longitudinal axis z of the handle 5. This facilitates the introduction of the distal end of the guide duct 7 into the mouth since the bent shape is adapted to a natural position of the hand.

The operating element 6 is designed as a slide and for the reciprocating displacement is drivable by the user, in particular by means of one finger. However, the operating element 6 can also be designed in a double-sided manner such that the former is selectively operable from one side or from the opposite side by way of two fingers or by way of one finger (cf. FIG. 1). Alternatively, the operating element 6 for the reciprocating displacement can be drivable by a motor, in particular having an adjustable frequency.

It can also be seen in FIG. 1 that the body 4 in the region of the guide duct 7 has an elongate slot 16. This slot 16 serves for relieving stress and for partially dissipating a drive force acting on the operating element 6 in the radial direction. This results in the advantage that any injury in the mouth is avoided. For example, it can be avoided in the case of tight spacing of the teeth, that is to say in the case of a closed trigone, that the user pushes too hard on the intended cleaning location. This could lead to injury to the gums when the cleaning body slips from the tooth, for example. In the case of a tight spacing of the teeth, the connection element 7 that in this embodiment is flexible bends and can partially deflect outward through the slot 16 and thus absorb part of the compression force of the cleaning body 3, on account of which a risk of injury is at least minimized. The slot 16 herein is dimensioned in such a manner that the connection element in the region thereof that in the above case is bent can penetrate outwardly through the slot 16. Any differences pertaining to the width along the length of the connection element are considered in the dimensioning and shaping of the slot 16. Apart from the use of the flexible positioning element 2, this optional feature represents a further factor which facilitates "blind" usage of the interdental brush. However, it is to be noted that the slot and the flexibility of the connection element 9 do not necessarily have to be provided in other embodiments, for example those of FIGS. 4 and 5. In this case which will be explained later, the main focus is on a cost-effective embodiment of the interdental brush. However, the connection element 9 is flexible in all other embodiments. This is a consequence of the preferred shape of the interdental brush 1 (FIGS. 1, 3, 6) having a bent distal end, this being explained in an exemplary manner in the context of FIG. 2. As mentioned, the bent distal end of the interdental brush 1 allows an ergonomic introduction into the mouth space and is therefore preferred to a solution having a straight distal end. A further advantage is the saving in space, wherein the space for handling the interdental brush 1 is very limited in the case of the typical usage of the interdental brush in the mouth.

Figure 2:
FIG. 2 shows a connection element having a cleaning body for the interdental brush as per FIG. 1.

FIG. 2 shows a pin 9 having a cleaning body 3 for the interdental brush 1 as per FIG. 1. It is to be noted in this context that the figures are not to scale in relation to one another. The pin 9 is produced from a flexible material such as flexural plastics. In this way, the pin during the reciprocal displacement can adapt to the bent shape of the guide duct 7. By contrast thereto, the guide duct 7 is preferably produced from a rigid material so as to impart stability to the interdental brush 1.

It is to be noted in the context of the rigid material that the term "rigid" in the context of the entire document is to be interpreted as relating to flexural rigidity. The flexural rigidity herein is to be understood such that the body or the guide duct, respectively, of the interdental brush when handled in the mouth can be bent only to a negligible extent. The term "flexible" is to be understood in relation to the flexural rigidity as defined above, specifically such that the connection element when bending in the guide duct causes bending of the guide duct that is only negligible, and that the connection element when bending between the retracted position and the deployed position, and vice versa, does not buckle.

The pin 9 having the cleaning body 3 is preferably interchangeable. Herein, replacement cleaning bodies having pins can be disposed in the interior of the handle 5 of the interdental brush. Various design embodiments of cleaning bodies 3 having connection elements 9 are shown in FIGS. 6-16. Various types of pin/cleaning body combinations can be stored as replacement cleaning bodies in the handle 5.

The pin 9 comprises one or a plurality of first convexities 10, the extent of which correspond to the diameter of the distal end of the guide duct 7. On account thereof, the pin 9 during use has improved retention in the guide duct, this being best visible in FIG. 3.

The pin furthermore has a cleaning body mounting 11 which preferably corresponds to the tapered shape of the positioning element 2. On account thereof, it is prevented, on the one hand, that the cleaning body 3 can be pushed too far out of the opening of the guide duct 7 at the distal end of the interdental brush 1, and the cleaning body 3 is centered in a simple manner, on the other hand, such that it is pushed out of the center of the opening.

The pin 9 preferably comprises a second convexity 12 for fastening the pin 9 to the operating element 6. A clip connection is preferably used herein. In other words, the operating element 6 has a recess which in FIG. 1 is visible at the location at which the line of the reference sign 6 ends, the second convexity 12 of the pin 9 being able to be clipped into said recess. However, other fastening systems can also be used, of course.

The cleaning body 3 in the embodiment shown is cylindrical, but can also have other shapes. For example, said cleaning body 3 can be funnel-shaped toward the tip.

Figure 3:
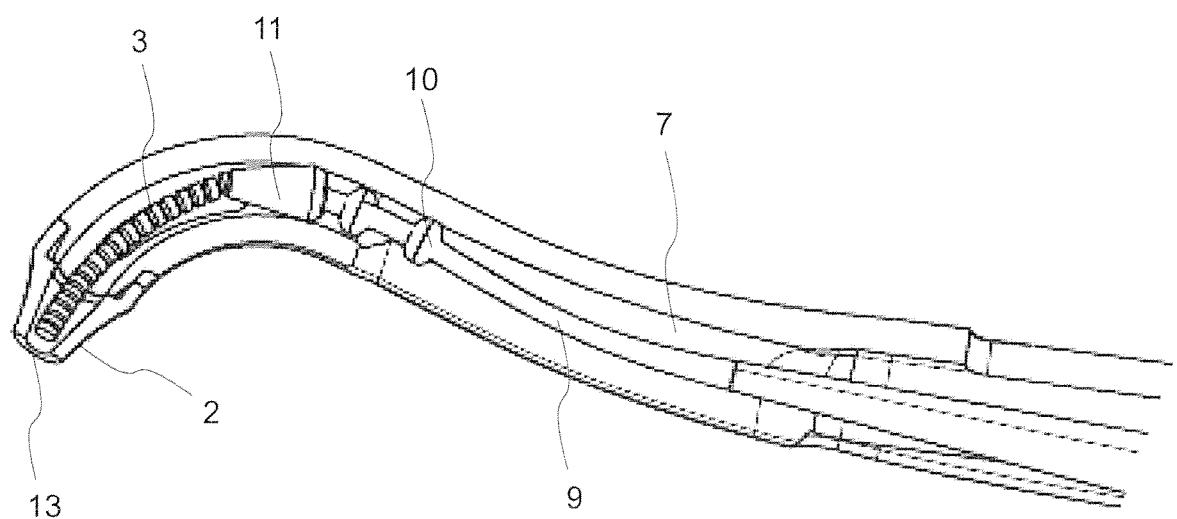
FIG. 3 shows a section through a body of the interdental brush.

FIG. 3 shows a section through the body 4 of the interdental brush 1. The arrangement of the positioning element 2, of the cleaning body 3, and of the connection element 9 in the guide duct 7 in the retracted position of the cleaning body 3 is visible in particular herein.

In one embodiment the positioning element 2 is interchangeable, in particular with a positioning element of dissimilar size and shape, wherein the opening of the positioning element toward the outside has the same diameter in the case of all embodiments. However, it is also possible for narrower or thicker cleaning bodies to be used, depending on how large the approximal spaces between two teeth are. In this case, the positioning element 2 in terms of the diameter thereof is of course adapted to the cleaning body 3. The diameter of the positioning element 2 herein is chosen so as to be somewhat smaller than the diameter of the cleaning body 3. The cleaning body 3 after use of the interdental brush 1 can be cleaned better in that the former is displaced in a reciprocating manner on the distal opening such that the bristles of the cleaning body 3 wipe the edges of the opening of the positioning element 2. The cleaning body in this embodiment is a small brush.

As mentioned, the positioning element 2 is preferably produced from a flexible, flexural material. On account thereof, it is ensured that the enamel or the gums, respectively, are not scratched or injured, respectively, during the positioning of the distal end, in other words of the distal opening. Furthermore, any discomfort if the user has sensitive teeth or tooth necks is minimized on account thereof.

The use of the interdental brush 1 will be described in a summarized manner hereunder.

As a first step, a pin 9 having cleaning body 3 is introduced into the interdental brush 1. For this purpose, the body 4 of the interdental brush 1 comprises an elongate introduction opening 14 (FIG. 1). The pin 9 is introduced into the guide duct 7 with the cleaning body 3 leading, and the second convexity 12 is clipped into the recess of the operating element 6 that is provided therefor. The interdental brush 1 is subsequently ready for use. In order for the approximal space between two teeth to be cleaned, the distal end of the interdental brush 1 is introduced into the mouth and positioned in the correct position, wherein the cleaning body 3 is kept in the retracted position. The positioning of the distal end or of the positioning element 2, respectively, at the approximal space is easy and intuitive by virtue of the funnel shape and of the bent distal end. As soon as the positioning element 2 is at the correct location, cleaning of the respective intermediate space between teeth can be performed in that the cleaning body 3 by means of the operating element 6 is moved to the deployed position and by means of moving the operating element 6 by way of one finger is displaced a reciprocating manner. Alternatively, the motor which takes over the reciprocating displacement of the pin 9 can be switched on. The cleaning body 3 herein does not have to be moved back to the retracted position but can describe a reciprocating displacement between the completely deployed position and a position in which the cleaning body 3 is still disposed outside the guide duct 7.

Figure 4:
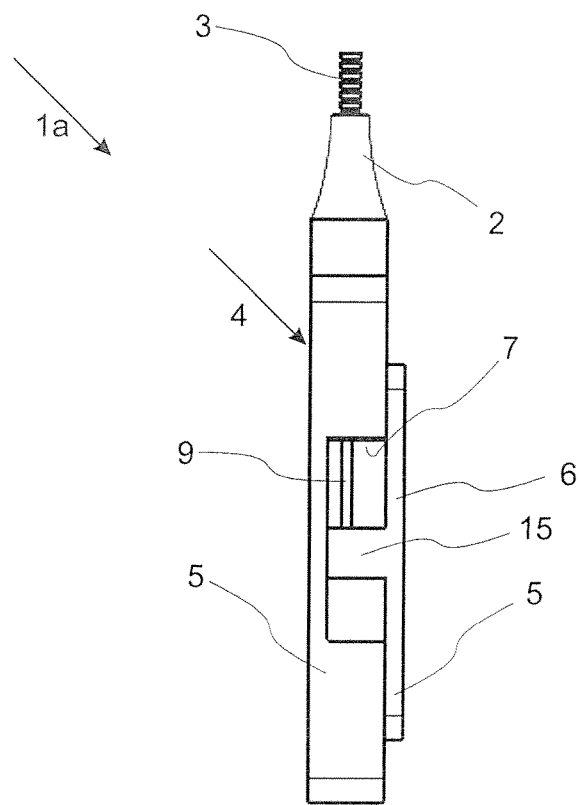
FIG. 4 shows a side view of a further embodiment of an interdental brush according to the invention.

A further embodiment of an interdental brush 1a according to the invention is shown in FIG. 4. Only the differences to the embodiments of the interdental brush already described will be discussed hereunder. The operating element 6 here comprises a web 15 to which the connection element 9 is fastened, wherein the operating element 6 is preferably molded so as to be integral with the web 15, the connection element 9, and the cleaning body 3. The web 15 is visible through a clearance in the body 4 that is preferably on both sides (cf. FIG. 4). This clearance serves for saving material. The guide duct 7 in the case of this embodiment is embodied so as to be straight and not bent. The interdental brush 1a by virtue of the integral construction of those parts of the interdental brush 1a that are movable in relation to the body 4, of the material savings that are due to the clearance, and of the straight shape, is cheap in production. In addition, said interdental brush 1a can be embodied so as to be very small such that the former can be held by only a thumb and an index finger, for example, this further contributing toward the savings in material. Said interdental brush 1a, for the reasons mentioned above, is very suitable as a disposable interdental brush, and by virtue of the small size is very readily usable on the road, and can be disposed of thereafter.

In another embodiment only the integral assembly of operating element 6, connection element 9, and cleaning body 3 can be disposed of in that said assembly is retrieved through the clearance and are replaced by a fresh assembly. In this case, the body can be composed of a high-grade material, or comprise design features, respectively, for example.

In one further variant (not shown) of the embodiment 1a of the interdental brush, the guide duct can be open on one side along the longitudinal axis of the body, wherein the connection element can fill the interior space of the guide duct with slight play such that said connection element is capable of sliding in a reciprocating manner therein.

Figure 5:
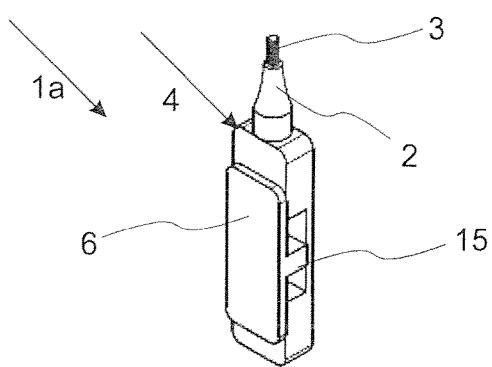
FIG. 5 shows a perspective view of the interdental brush as per FIG. 4.

FIG. 5 shows a perspective view of the embodiment of FIG. 4, in order to highlight the shape and arrangement of the clearance and of the operating element 6. In the case of this embodiment 1a, the handle 5 can be partially formed by the operating element 6 and partially by a rear part of the body 4. The user herein holds the interdental brush 1a with one finger on the body 4 and another finger on the operating element 6.

The connection element 9 in the embodiments 1 and 1a can also have a distal end of such a type that only the cleaning body 3 is interchangeable. The cleaning body 3 can be push-fitted onto the distal end of the connection element 9, for example.

A variant of the embodiment of the interdental brush 1 wherein the cleaning body 3 and the connection element 9 (pin) are combined as a cleaning device will be described hereunder.

Figure 6:
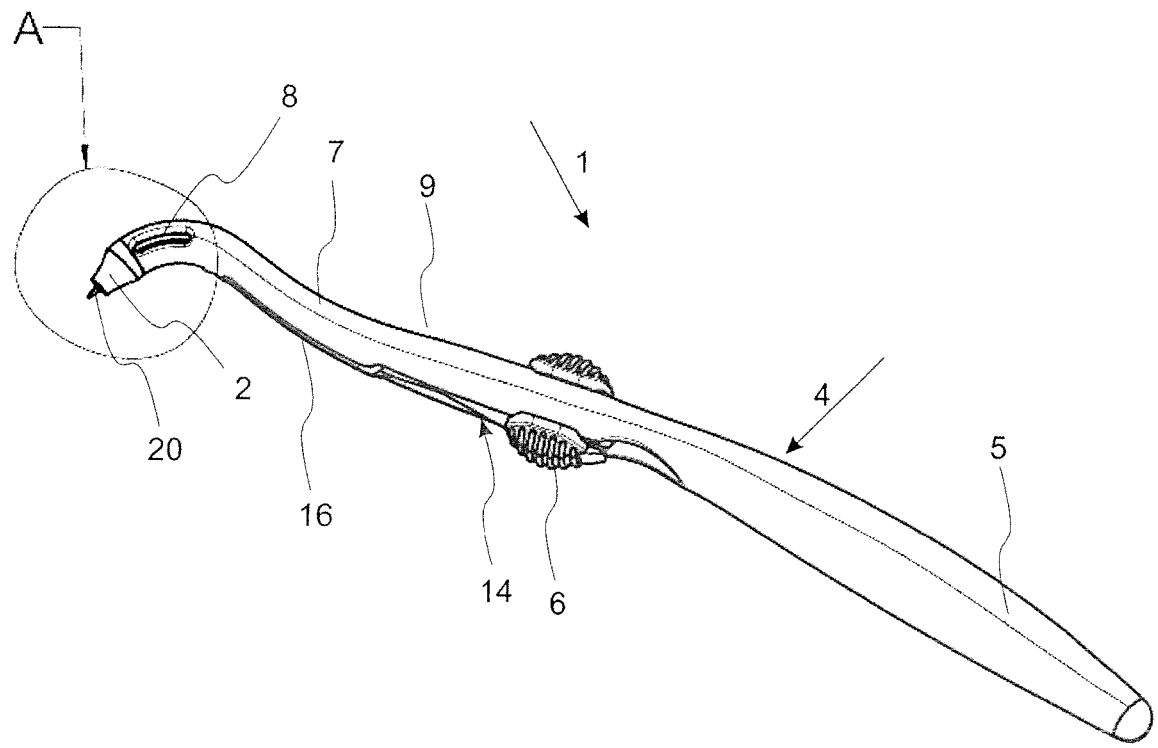
FIG. 6 shows a further embodiment of an interdental brush according to the invention.
Figure 7:
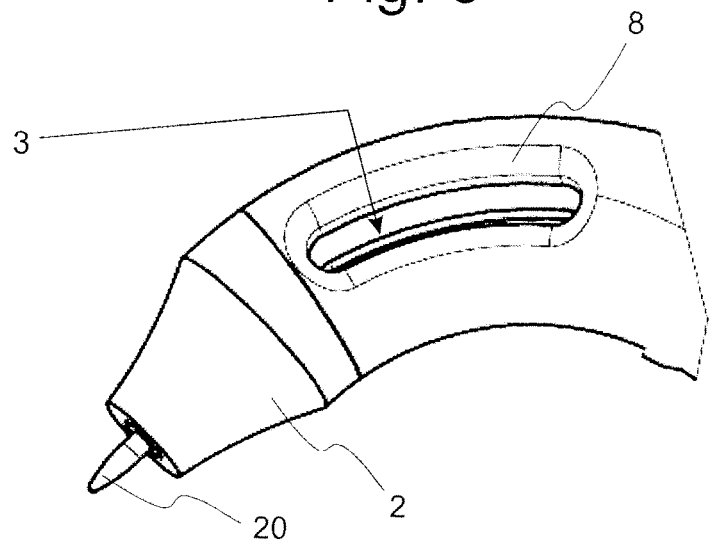
FIG. 7 shows detail A of FIG. 6.

The interdental brush 1 of FIG. 6 differs from that of FIG. 1 only in that the cleaning body 3 is of a different design. Therefore, reference is made to the description of FIG. 1 for the description of the remaining aspects of the interdental brush 1. FIG. 7 shows a detail A of FIG. 6, showing a pointed rod-shaped element 20 which protrudes from the positioning element 2. The rod-shaped element is disposed on the free end of the cleaning body, so as to be in the extension of a main body of the cleaning body 3. In particular, the pointed rod-shaped element 20 does not carry any protrusions for cleaning teeth. The cleaning body 3 having the main body is not visible in this figure, since said two bodies are located in the interior of the guide duct of the interdental brush 1 (indicated by the arrow 3). However, the construction of the cleaning body will be discussed in more detail in the context of FIGS. 8 to 16.

It is preferable that the rod-shaped element 20 in the retracted state shown of the cleaning body 3 or of the cleaning device, respectively, protrudes at least partially from the positioning element, since in addition to the respective effect of the positioning element 2 the positioning of the interdental brush at the approximal space between two teeth on account thereof offers further facilitation. The rod-shaped element 20 herein is produced so as to be integral with the cleaning body 3 and preferably from a rubber-based material, or from Teflon, respectively, and is flexible in terms of bending, in order for said rod-shaped element not to injure the teeth or the gums and to be able to be more readily fitted into the approximal space. The rod-shaped element protrudes from the positioning element by between 0.5 and 1.5 mm, preferably by approx. 1 mm, so as to be sufficient to develop the positioning effect and not to interfere too much with the introduction into the mouth. It is preferable herein that the rod-shaped element 20 protrudes so far that the tip thereof has a gradient which follows substantially the profile of the funnel-shaped positioning element 3. With this arrangement, the user can slide the rod-shaped element 20 along the teeth in order to intuitively find the approximal space to be cleaned. On account thereof, the positioning of the interdental brush in the mouth becomes even more precise and rapid, since the rod-shaped element enables even more sensitive sensory exploration of the relief of the row of teeth than the thicker positioning element 2. Once the correct position has been found, the positioning element can be engaged at the approximal space, and the distal tip of the interdental brush 1 can be imparted an even more stable footing. On account of the rod-shaped element having already found the passage between the teeth, the cleaning body 3 upon subsequent activation of the operating element 6 is directed directly in the correct direction.

However, it is of course also possible for the pointed rod-shaped element 20 in the retracted state of the cleaning device to be completely retracted into the guide duct of the interdental brush 1, wherein this option can be provided additionally or alternatively to the embodiment above. For example, it is possible for two retracted positions to be provided, wherein the position with the completely retracted cleaning device can be used for example when storing the interdental brush while travelling, and the position having the protruding rod-shaped element 20 is employed for the daily dental care routine.

The pointed rod-shaped element 20 is of course usable also for the embodiments of FIGS. 1 to 5.

Figure 8:
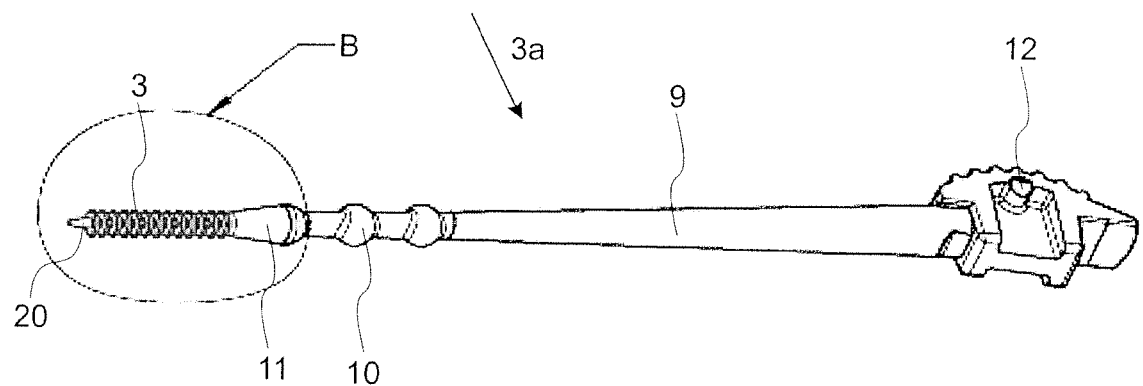
FIG. 8 shows a cleaning device according to the invention, having a first embodiment of a cleaning body according to the invention.
Figure 9:
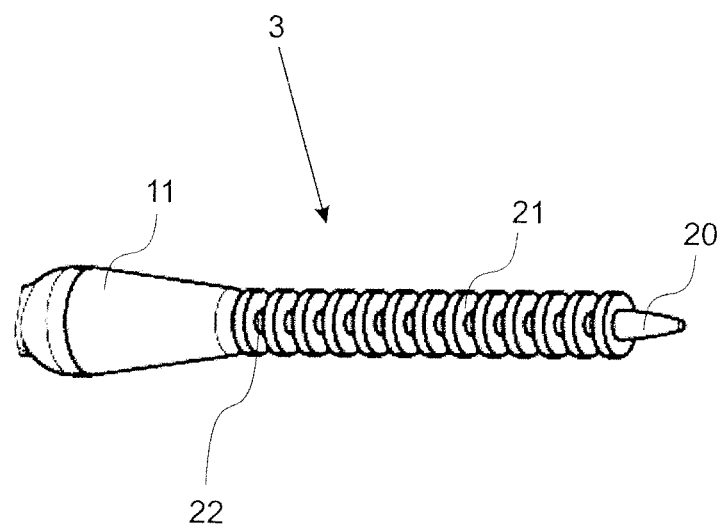
FIG. 9 shows detail B of FIG. 8.

FIG. 8 shows an embodiment of the cleaning device 3a, and FIG. 9 shows an enlargement of the cleaning body 3 of the cleaning device 3a. Reference is made to FIG. 2 for the description of the further elements of the cleaning device 3a, said FIG. 2 also showing a cleaning device.

The cleaning device 3a comprises in general a main body 22 which carries or comprises at least one protrusion, and is mounted in a cleaning body mounting 11. A plurality of protrusions 21 of the cleaning body 3 are provided in the special embodiment as per FIG. 9, wherein the protrusions 21 are disposed in an annular manner along the main body 22 and at a consistent mutual spacing around the main body 22. The annular protrusions in this embodiment have identical diameters.

In another embodiment (FIGS. 10 and 11) which is similar to the embodiment of the cleaning device as per FIG. 2, a plurality of protrusions 31 of the cleaning body 3 are also provided, wherein the protrusions in this case are filaments 31, and the entirety of the filaments 31 form a small brush.

Figure 10:
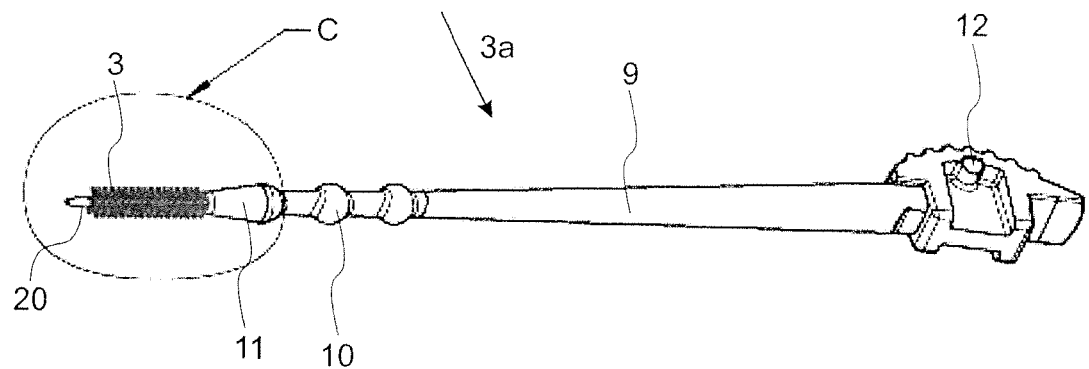
FIG. 10 shows a cleaning device according to the invention, having a second embodiment of a cleaning body according to the invention.
Figure 11:
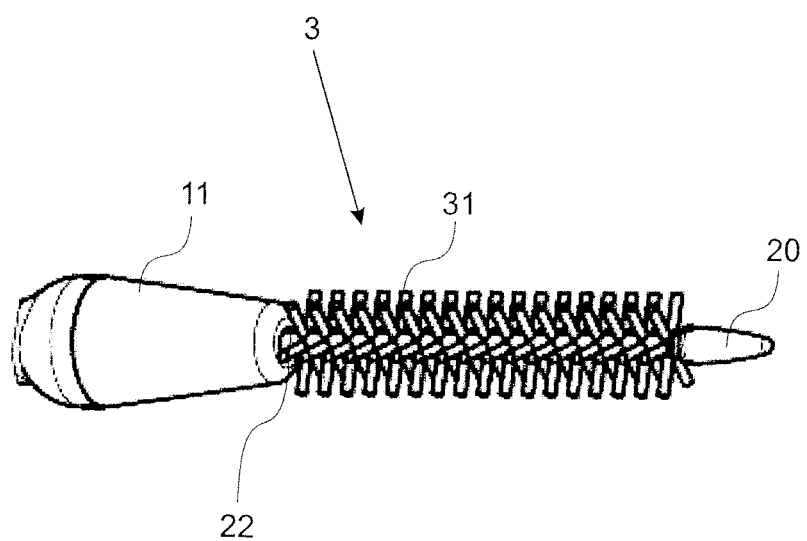
FIG. 11 shows detail C of FIG. 10.

Embodiments of the cleaning device 3a are shown in FIG. 8 and FIG. 10. Said embodiments correspond to the embodiment as per FIG. 2, wherein another type of the coupling element 12 is shown here in an exemplary manner. Said coupling element 12 here is not provided by a convexity as in FIG. 2, but by a transverse pin through the body of the connection element 9 that after the introduction of the cleaning device 3a into the guide duct 7 of the interdental brush 1 is received in receptacles of the body 5 of the interdental brush 1 that are provided therefor. It is preferable for this connection to be a clip connection, wherein other known forms of connections are also possible. The receptacle for the coupling element 12 in the operating element 6 is especially provided in the case of this embodiment (not shown), wherein the cleaning device 3a has a surface which upon fastening of the coupling element 12 is flush with the activation surface of the operating element 6 and preferably also has the serrations or the structure, respectively, of said activation face.

FIGS. 12 to 15 show embodiments of the cleaning body 3 in which the protrusion or the protrusions extends or extend, respectively, along the main body 22 in a screw-shaped or helical manner about the latter. It is to be noted in this context that a single protrusion is referred to in the context of this document when said protrusion across the entire cross section thereof has no interruptions.

Figure 12:
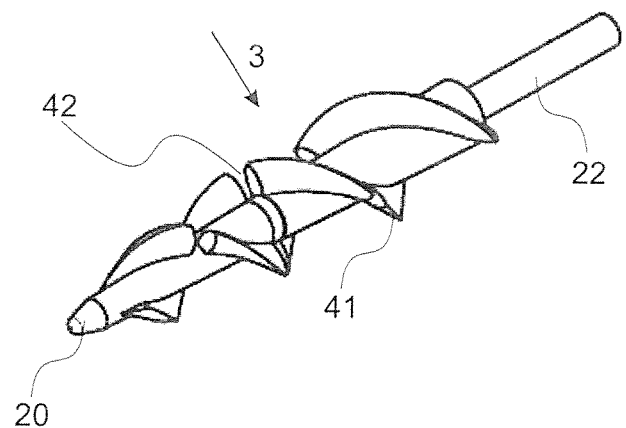
FIG. 12 shows a further embodiment of a cleaning body according to the invention.

An embodiment of a cleaning body 3 in which a plurality of protrusions 41 are also provided is illustrated in FIG. 12. The protrusions are disposed in a screw-shaped manner, and neighboring protrusions 41 are mutually separated by a gap 42.

Figure 13:
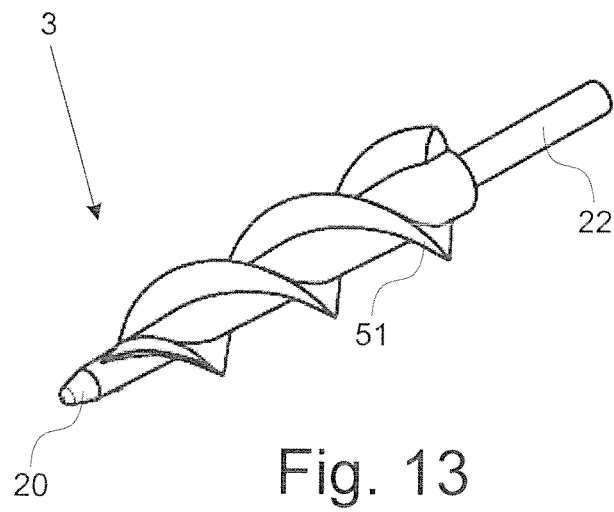
FIG. 13 shows a further embodiment of a cleaning body according to the invention.

Two protrusions 51 which are disposed in a screw-shaped manner along the main body 22 and in terms of the screw shape are in mutually opposite directions are used in the case of FIG. 13.

Figure 14:
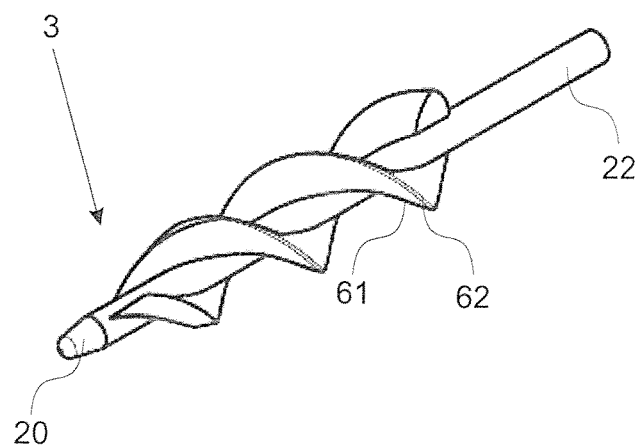
FIG. 14 shows a further embodiment of a cleaning body according to the invention.

FIG. 14 shows an alternative in which the protrusions 61, as is the case in the embodiment of FIG. 13, do not have any interruptions. The screw-shaped protrusions in this case are wider such that the latter at the free extremities thereof in each case form one shoulder 62.

Figure 15:
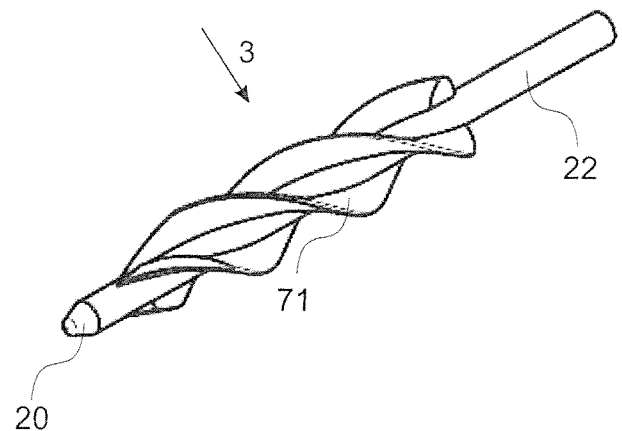
FIG. 15 shows a further embodiment of a cleaning body according to the invention.

FIG. 15 shows an embodiment which is similar to the embodiments of FIGS. 13 and 14. The protrusions 71 here are thinner. Of course, in the case of embodiments having screw-shaped or helical protrusions, parameters such as pitch, the degree of screw-fit (mean angle of the protrusion in relation to the longitudinal axis), thickness are modifiable in principle.

Figure 16:
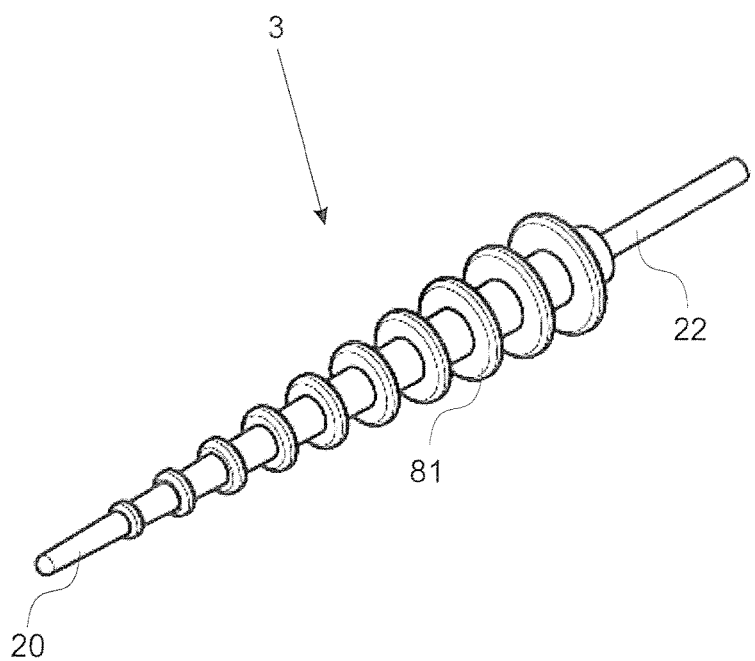
FIG. 16 shows a further embodiment of a cleaning body according to the invention.

FIG. 16 shows an embodiment of the cleaning body 3 which is similar to that of FIG. 9, the point of difference being that the diameter of the protrusions 81 which are also disposed around the main body 22 decreases toward the rod-shaped element 20, and the spacing between neighboring protrusions 81 is larger.

All embodiments of the cleaning device are preferably produced from a material that is based on rubber or silicone. It is furthermore preferable for the cleaning body 3 to be cast in one piece, this increasing the stability of the latter. However, it can also be provided that the main body 22 in the interior thereof is provided with additional reinforcement fibers so as to increase the rigidity of said main body 22. Such a measure has little influence on the integral design of the cleaning body, since the reinforcement fibers can be put in place first, and the main composition of the main body 22 can subsequently be cast around said reinforcement fibers.

The embodiments described of the interdental brush 1, 1a having the associated cleaning devices 3a and cleaning bodies 3 have a simple construction and are light, in particular in the version without a motor, this facilitating the handling of said embodiments. Cleaning is facilitated on account of the movement of the cleaning body 3 being effected from outside the mouth. Not least, it is advantageous that not the entire interdental brush 1 but only the pin 9 having the cleaning body 3 has to be moved. On account thereof, any unintentional displacement of the interdental brush 1 in the mouth is prevented, and the risk of the cleaning body 3 snapping or bending is minimized.

The bent shape and the presence of the positioning element in the respective embodiments make for a very intuitive use. Again, the embodiments having a straight body or guide duct, respectively, are easier to produce and therefore cheaper such that the former can also be suitable as disposable interdental brushes.

Furthermore, by virtue of the positioning element the introduction of the interdental brush into the trigone between the tooth, the neighboring tooth, and the papilla is enabled without visual contact. The risk of injury is practically excluded by virtue of the positioning function and the orientation function of the positioning element. Furthermore, the interdental brush according to the invention, by virtue of the introduction and support function of the positioning element, also enables an introduction into the mouth at an oblique angle without any visual contact. The positioning element has a reference function which enables the interdental brush to be moved freely in a reciprocating manner through the approximal space as soon as the sliding introduction has taken place. A further advantage of the interdental brush according to the invention lies in that buckling of the cleaning body during the introduction is prevented since the positioning element, apart from the other functions thereof, also has a protective function in relation to the cleaning body. Finally, the positioning element has a plaque stripping function when the interdental brush is cleaned under running water.

While preferred embodiments of the invention have been described, it is to be pointed out that the invention within the scope of the claims hereunder can be implemented in other ways. Terms used in the description such as "preferable", "in particular", "advantageous", etc. herein only refer to optional and exemplary embodiments.

The invention claimed is:

1. An interdental brush comprising:
a brush body having a handle and a guide duct, the guide duct defining a distal end, the distal end being distal from the handle;
a flexible positioning element, the positioning element provided at the distal end of the guide duct and being tapered;
an operating element; and
a cleaning device comprising a cleaning body and an elongate connection element defining a proximal and distal end, the cleaning body being disposed on the distal end of the connection element, the connection element being made of a flexible material disposed within the guide duct and wherein a coupling element longitudinally extends from the proximal end of the connection element and is configured to removably couple with a receptacle extending from the operating element;
wherein the cleaning device is displaceable by actuation of the operating element in a reciprocating manner between a retracted position in which the cleaning body is disposed within the guide duct, and a deployed position in which the cleaning body protrudes outwardly from the distal end of the guide duct;
wherein the positioning element is engageable with an approximal space between the two teeth, such that the cleaning body is configured to be deployed into the approximal space while in the deployed position;
wherein the connection element is configured to be interchangeably and removably connected to the operating element;
wherein the interdental brush comprises a circumferential outer surface; the circumferential outer surface comprising a longitudinally extending slot, the slot arranged and dimensioned such that a bent portion of the connection element can deflect outward through the slot to outside the guide duct when the connection element is bent due to certain compression forces being applied to the cleaning body.

2. The interdental brush as claimed in claim 1, wherein the positioning element is elastically deformable and when engaging at the approximal space adapts at least partially to a contour of the approximal space.

3. The interdental brush as claimed in claim 1, wherein the guide duct is made of a rigid material and in relation to a longitudinal axis of the brush body has at least one curvature in such a manner that the free end of the guide duct is not parallel with the longitudinal axis.

4. The interdental brush as claimed in claim 1, wherein an opening of the positioning element through which the cleaning body in the deployed position exits toward the outside has a smaller diameter than the cleaning body.

5. The interdental brush as claimed in claim 1, wherein guide duct has an axial opening at its distal end through which the cleaning body protrudes in the deployed position, and wherein the at least one lateral opening, the lateral opening being dimensioned to allow air to circulate between an interior space of the guide duct and the environment.

6. The interdental brush as claimed in claim 5, wherein the at least one lateral opening is disposed in a region in which the cleaning body in the retracted position comes to rest.

7. The interdental brush as claimed in claim 1, wherein the operating element is designed as a slide and is manually drivable by a user for carrying out a reciprocating displacement.

8. The interdental brush as claimed in claim 1, wherein the brush body has a circumferential surface in which an elongate introduction opening is formed, and wherein the connection element, together with the cleaning body, is laterally introducible into the guide duct through the introduction opening.

9. The interdental brush as claimed in claim 1, wherein the cleaning body comprises a main body having at least one protrusion, the cleaning body defining a free end, the cleaning body further comprising a pointed rod-shaped element, the rod-shaped element being provided at the free end of the cleaning body.

10. The interdental brush as claimed in claim 1, wherein the cleaning body is produced in an integral manner from one material.

11. The interdental brush as claimed in claim 1, wherein the cleaning body has a plurality of protrusions.

12. The interdental brush as claimed in claim 11, wherein the cleaning body has at least one protrusion that extends about the main body in a screw-shaped or helical manner.

13. The interdental brush as claimed in claim 1,
wherein the connection element is pin-shaped and comprises a convexity, and
wherein the operating element has a recess, the convexity being configured to be clipped into the recess.

14. The interdental brush as claimed in claim 1,
wherein the connection element comprises a coupling element in the form of a transverse pin extending through the connection element, and
wherein the operating element has a receptacle for the coupling element.

15. The interdental brush as claimed in claim 14, wherein the connection element has a surface which is flush with an activation surface of the operating element when the coupling element has been fastened to the operating element.

16. The interdental brush as claimed in claim 15,
wherein the activation surface of the operating element has a surface structure, and
wherein the surface of the connection element that is flush with the activation surface has a surface structure that is identical to the surface structure of the activation surface.

17. The interdental brush as claimed in claim 1, wherein the connection element is pin-shaped and comprises at least one convexity having an extent that corresponds to a diameter of the distal end of the guide duct.

* * * * *